United States Patent
Williams et al.

(10) Patent No.: US 11,593,026 B2
(45) Date of Patent: Feb. 28, 2023

(54) ZONE STORAGE OPTIMIZATION USING PREDICTIVE PROTOCOL PATTERNS

(71) Applicant: INTERNATIONAL BUSINESS MACHINES CORPORATION, Armonk, NY (US)

(72) Inventors: Jordan Harrison Williams, Chicago, IL (US); Benjamin Lee Martin, Gatesville, TX (US); Ilya Volvovski, Chicago, IL (US); Praveen Viraraghavan, Chicago, IL (US); Khushbu Patel, Carol Stream, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/811,477

(22) Filed: Mar. 6, 2020

(65) Prior Publication Data
US 2021/0278997 A1 Sep. 9, 2021

(51) Int. Cl.
*G06F 3/06* (2006.01)

(52) U.S. Cl.
CPC .......... *G06F 3/0659* (2013.01); *G06F 3/0604* (2013.01); *G06F 3/067* (2013.01)

(58) Field of Classification Search
CPC ....... G06F 3/0659; G06F 3/067; G06F 3/0604
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,864,875 A | 1/1999 | Van .................. G06F 30/00 |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |

(Continued)

OTHER PUBLICATIONS

Anonymous, "Cutting the cord: Why we took the file system out of our storage nodes," http://docplayer.net/63782459-Cutting-the-cord-why-we-took-the-file-system-out-of-our-storage-nodes.html, accessed Apr. 23, 2020, 4 pages.

(Continued)

*Primary Examiner* — Mark A Giardino, Jr.
(74) *Attorney, Agent, or Firm* — Randy Emilio Tejeda; Andrew D. Wright; Calderon Safran & Cole P.C.

(57) ABSTRACT

A method includes: receiving, by a computing device, data for storage in a dispersed storage network; writing, by the computing device, the data to a first location; generating, by the computing device, a first pointer to the first location; receiving, by the computing device, updated data that is an updated version of the data; writing, by the computing device, the updated data to a second location; generating, by the computing device, a second pointer to the second location; and deleting, by the computing device, the first pointer at a time after writing the updated data and generating the second pointer.

10 Claims, 8 Drawing Sheets

(56) References Cited

U.S. PATENT DOCUMENTS

| | | | |
|---|---|---|---|
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,377,500 B1 | 4/2002 | Fujimoto | G06F 12/0246 |
| | | | 365/230.01 |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,552,148 B2 | 6/2009 | Liu | G06F 11/1435 |
| | | | 714/24 |
| 7,636,724 B2 | 12/2009 | de la Torre et al. | |
| 8,458,127 B1 | 6/2013 | Lorch, III | G06F 11/1456 |
| | | | 707/661 |
| 8,595,435 B2 | 11/2013 | Cilfone | G06F 11/1076 |
| | | | 711/170 |
| 8,625,637 B2 | 1/2014 | Baptist et al. | |
| 8,667,273 B1 | 3/2014 | Billstrom | G06F 21/6209 |
| | | | 713/165 |
| 8,699,159 B1* | 4/2014 | Malina | G11B 20/10305 |
| | | | 360/31 |
| 8,880,801 B1 | 11/2014 | Robins | G06F 11/1092 |
| | | | 711/170 |
| 8,892,598 B2 | 11/2014 | Motwani | |
| 8,965,939 B2 | 2/2015 | Leggette et al. | |
| 9,152,489 B2 | 10/2015 | Baptist et al. | |
| 9,292,520 B1 | 3/2016 | Madiraju Varadaraju | |
| | | | G06F 11/1451 |
| 9,462,316 B2 | 10/2016 | Gladwin | H04N 21/274 |
| 9,571,570 B1 | 2/2017 | Mutnuru | G06F 11/3433 |
| 9,621,427 B1 | 4/2017 | Shah | G06F 9/45533 |
| 9,774,684 B2 | 9/2017 | Dhuse | H04L 67/1097 |
| 9,785,510 B1* | 10/2017 | Madhavarapu | G06F 11/1471 |
| 9,846,540 B1 | 12/2017 | Franklin | G06F 3/0616 |
| 9,858,006 B1 | 1/2018 | Wu | G06F 12/0284 |
| 10,216,757 B1 | 2/2019 | Armangau | G06F 16/178 |
| 10,360,928 B1* | 7/2019 | Brockie | G11B 5/012 |
| 10,379,950 B2 | 8/2019 | Gholamipour et al. | |
| 10,394,468 B2* | 8/2019 | Baptist | G06F 3/067 |
| 10,635,360 B1 | 4/2020 | Volvovski | |
| 10,754,574 B1* | 8/2020 | Jo | G06F 3/064 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0126387 A1 | 7/2003 | Watanabe | G06F 11/2058 |
| | | | 711/161 |
| 2004/0024963 A1 | 2/2004 | Talagala et al. | |
| 2004/0098545 A1 | 5/2004 | Pline | G06F 13/1684 |
| | | | 711/115 |
| 2004/0122917 A1 | 6/2004 | Menon et al. | |
| 2004/0177100 A1 | 9/2004 | Bjorner | G06F 12/0253 |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2005/0283649 A1 | 12/2005 | Turner | H04L 67/1095 |
| | | | 714/6.12 |
| 2006/0047907 A1 | 3/2006 | Shiga et al. | |
| 2006/0107010 A1 | 5/2006 | Hirezaki | G06F 3/067 |
| | | | 711/165 |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0006322 A1 | 1/2007 | Karimzadeh | G06F 21/6227 |
| | | | 726/28 |
| 2007/0078901 A1 | 4/2007 | Satou | G06F 3/0685 |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2007/0299887 A1 | 12/2007 | Novik | G06F 16/273 |
| | | | 707/999.203 |
| 2008/0320243 A1 | 12/2008 | Mitsuzuka | G06F 15/167 |
| | | | 711/153 |
| 2009/0094251 A1 | 4/2009 | Gladwin et al. | |
| 2009/0094318 A1 | 4/2009 | Gladwin et al. | |
| 2009/0112823 A1* | 4/2009 | Aharonov | G06F 21/64 |
| 2009/0217056 A1 | 8/2009 | Malpani | G06F 21/41 |
| | | | 713/193 |
| 2010/0023524 A1 | 1/2010 | Gladwin et al. | |
| 2010/0094955 A1 | 4/2010 | Zuckerman | H04L 67/1097 |
| | | | 709/219 |
| 2010/0153638 A1 | 6/2010 | Yochai | G06F 11/2092 |
| | | | 711/E12.019 |
| 2010/0235321 A1 | 9/2010 | Shukla | H04L 67/10 |
| | | | 707/610 |
| 2011/0029711 A1 | 2/2011 | Dhuse | G06F 11/1092 |
| | | | 711/170 |
| 2011/0029731 A1* | 2/2011 | Cilfone | G06F 3/0607 |
| | | | 711/114 |
| 2011/0029809 A1 | 2/2011 | Dhuse | G06F 11/1092 |
| | | | 714/6.1 |
| 2011/0060974 A1 | 3/2011 | Viger | H04L 1/0057 |
| | | | 714/800 |
| 2011/0071988 A1 | 3/2011 | Resch | G06F 11/1076 |
| | | | 707/E17.007 |
| 2011/0072210 A1 | 3/2011 | Dhuse | G06F 11/1076 |
| | | | 711/114 |
| 2011/0072321 A1 | 3/2011 | Dhuse | G06F 11/1076 |
| | | | 714/E11.023 |
| 2011/0078373 A1 | 3/2011 | Hoffman | G06F 16/1827 |
| | | | 711/170 |
| 2011/0106904 A1 | 5/2011 | Resch | G06F 11/1076 |
| | | | 711/E12.002 |
| 2011/0125999 A1 | 5/2011 | Cilfone | G06F 11/1076 |
| | | | 711/E12.001 |
| 2011/0161666 A1 | 6/2011 | Gladwin | G06F 21/80 |
| | | | 711/E12.092 |
| 2011/0184997 A1 | 7/2011 | Grube | H04L 67/1097 |
| | | | 707/827 |
| 2011/0185141 A1 | 7/2011 | Dhuse | G06F 3/067 |
| | | | 711/E12.002 |

(56) References Cited

U.S. PATENT DOCUMENTS

| | | | |
|---|---|---|---|
| 2011/0225362 A1 | 9/2011 | Leggette | G06F 3/0619 711/114 |
| 2011/0225386 A1 | 9/2011 | Motwani | G06F 11/1076 711/170 |
| 2011/0228931 A1 | 9/2011 | Grube | G06F 11/10 713/189 |
| 2011/0276744 A1 | 11/2011 | Sengupta | G11C 7/1072 711/216 |
| 2011/0295796 A1 | 12/2011 | Muhunthan | G06F 16/27 707/610 |
| 2011/0296133 A1 | 12/2011 | Flynn | G06F 3/0619 711/171 |
| 2012/0005440 A1 | 1/2012 | Nakao | G06F 3/0685 711/E12.002 |
| 2012/0089809 A1 | 4/2012 | Resch | G06F 11/08 711/206 |
| 2012/0102316 A1 | 4/2012 | Resch | G06F 11/1076 713/150 |
| 2012/0117351 A1 | 5/2012 | Motwani | G06F 3/0605 711/E12.002 |
| 2012/0137091 A1 | 5/2012 | Grube | G06F 12/0638 711/158 |
| 2012/0137095 A1 | 5/2012 | Grube et al. | |
| 2012/0163596 A1 | 6/2012 | Grube | G06F 3/067 380/252 |
| 2012/0166757 A1 | 6/2012 | Volvovski | G06F 3/0604 711/206 |
| 2012/0179887 A1 | 7/2012 | Maruyama | G06F 3/061 711/E12.103 |
| 2012/0198197 A1 | 8/2012 | Gladwin | G06F 16/1727 711/170 |
| 2012/0221611 A1 | 8/2012 | Watanabe | G06F 3/0671 707/827 |
| 2012/0278569 A1 | 11/2012 | Kawakami | G06F 3/0641 711/E12.103 |
| 2012/0311068 A1 | 12/2012 | Gladwin | H04L 67/1097 709/214 |
| 2013/0173561 A1 | 7/2013 | Cherian | G06F 3/0641 707/E17.005 |
| 2013/0198130 A1 | 8/2013 | Resch | G06F 11/08 707/609 |
| 2013/0232307 A1 | 9/2013 | Clifone | H04L 67/1097 711/154 |
| 2013/0238900 A1 | 9/2013 | Leggette | G06F 11/2058 713/165 |
| 2013/0275545 A1 | 10/2013 | Baptist | H04L 67/42 709/215 |
| 2013/0275699 A1 | 10/2013 | Cheriton | G06F 12/00 711/162 |
| 2013/0275744 A1 | 10/2013 | Resch | H04L 67/10 713/150 |
| 2013/0282953 A1 | 10/2013 | Orme | G06F 12/0238 711/102 |
| 2013/0304746 A1 | 11/2013 | Dhuse | G06F 16/322 707/743 |
| 2013/0318313 A1 | 11/2013 | Clifford | G06F 11/1461 711/E12.103 |
| 2013/0326264 A1 | 12/2013 | Resch | G06F 11/1088 714/6.2 |
| 2013/0339316 A1 | 12/2013 | Hirsch | G06F 3/0641 707/E17.032 |
| 2013/0339420 A1 | 12/2013 | Srinivasan | H04L 67/06 709/201 |
| 2013/0346716 A1 | 12/2013 | Resch | G06F 3/067 711/162 |
| 2013/0346795 A1 | 12/2013 | Gladwin | G06F 3/0619 714/6.22 |
| 2014/0068259 A1 | 3/2014 | Resch | H03M 13/611 713/189 |
| 2014/0074786 A1 | 3/2014 | Leggette | G06F 3/0689 707/638 |
| 2014/0156716 A1 | 6/2014 | Baptist et al. | |
| 2014/0195875 A1 | 7/2014 | Resch | G06F 11/1092 714/763 |
| 2014/0236913 A1 | 8/2014 | Chakradhar | G06F 16/2343 707/703 |
| 2014/0279912 A1 | 9/2014 | Anglin | G06F 11/2023 707/640 |
| 2014/0281804 A1 | 9/2014 | Resch | H04L 67/06 714/763 |
| 2014/0281817 A1 | 9/2014 | Grube | H04L 41/5054 714/769 |
| 2014/0325157 A1 | 10/2014 | Sangapu | G06F 3/0689 711/126 |
| 2014/0330923 A1 | 11/2014 | Baptist | G06F 11/1474 709/213 |
| 2014/0344227 A1 | 11/2014 | Grube | G06F 3/0647 707/812 |
| 2014/0344617 A1 | 11/2014 | Resch | G06F 11/1092 714/6.31 |
| 2014/0351457 A1 | 11/2014 | Baptist | H04L 69/22 710/5 |
| 2015/0002522 A1 | 1/2015 | Nalluri | G06T 1/20 345/522 |
| 2015/0006780 A1 | 1/2015 | Shao | G06F 13/4045 710/316 |
| 2015/0100846 A1 | 4/2015 | Gladwin | |
| 2015/0113326 A1 | 4/2015 | Talagala | G06F 11/1441 714/24 |
| 2015/0347440 A1 | 12/2015 | Habouzit | G06F 16/1734 707/824 |
| 2016/0070652 A1 | 3/2016 | Sundararaman | G06F 3/0647 711/154 |
| 2016/0142249 A1 | 5/2016 | Wu | H04L 67/1097 709/222 |
| 2016/0170871 A1 | 6/2016 | Hyun | G06F 3/0653 711/103 |
| 2016/0188253 A1 | 6/2016 | Resch | G06F 3/0647 711/172 |
| 2016/0278014 A1 | 9/2016 | Chen | H04W 52/0235 |
| 2017/0153942 A1 | 6/2017 | Cabral | G06F 11/108 |
| 2017/0185312 A1* | 6/2017 | Smith | G06F 3/0608 |
| 2017/0353580 A1 | 12/2017 | Horan | G06F 3/061 |
| 2017/0371542 A1* | 12/2017 | Dhuse | G06F 3/061 |
| 2018/0107397 A1 | 4/2018 | Gray | G06F 3/064 |
| 2018/0107431 A1 | 4/2018 | Resch | G06F 3/0607 |
| 2018/0107545 A1 | 4/2018 | Gray | G06F 3/064 |
| 2018/0239546 A1* | 8/2018 | Baptist | H04L 67/1097 |
| 2018/0241818 A1 | 8/2018 | Baptist et al. | |
| 2018/0246670 A1 | 8/2018 | Baptist et al. | |
| 2018/0373459 A1 | 12/2018 | Resch | G06F 3/0604 |
| 2019/0171721 A1* | 6/2019 | Oukid | G06F 16/2329 |
| 2019/0310782 A1* | 10/2019 | Baptist | G06F 3/0619 |
| 2020/0218471 A1 | 7/2020 | Chen | G06F 3/0631 |
| 2020/0356300 A1* | 11/2020 | Mahajan | G06F 3/067 |

OTHER PUBLICATIONS

Final Office Action dated Oct. 20, 2021 in related U.S. Appl. No. 16/451,242, 38 pages.
Mell et al., "The NIST Definition of Cloud Computing", NIST, Special Publication 800-145, Sep. 2011, 7 pages.
Leonard et al., "IBM Cloud Object Storage Concepts and Architecture System Edition", IBM Redbooks, 2019, 34 pages.
Anonymous, "Packed Slice Storage", IBM Cloud Object Storage System™ Version 3.14.0, 2016, 28 pages.
Chung; An Automatic Data Segmentation Method for 3D Measured Data Points; National Taiwan University; pp. 1-8; 1998.
Harrison; Lightweight Directory Access Protocol (LDAP): Authentication Methods and Security Mechanisms; IETF Network Working Group; RFC 4513; Jun. 2006; pp. 1-32.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
Legg; Lightweight Directory Access Protocol (LDAP): Syntaxes and Matching Rules; Ie If Network Working Group; RFC 4517; Jun. 2006; pp. 1-50.

(56) References Cited

OTHER PUBLICATIONS

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association tor Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermershem; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

List of IBM Patents or Patent Applications Treated as Related, dated Sep. 15, 2021, 1 page.

Final Office Action dated Oct. 20, 2021 in related U.S. Appl. No. 16/451,242, 45 pages.

Notice of Allowance dated May 25, 2022 in U.S. Appl. No. 16/451,242, 18 pages.

\* cited by examiner

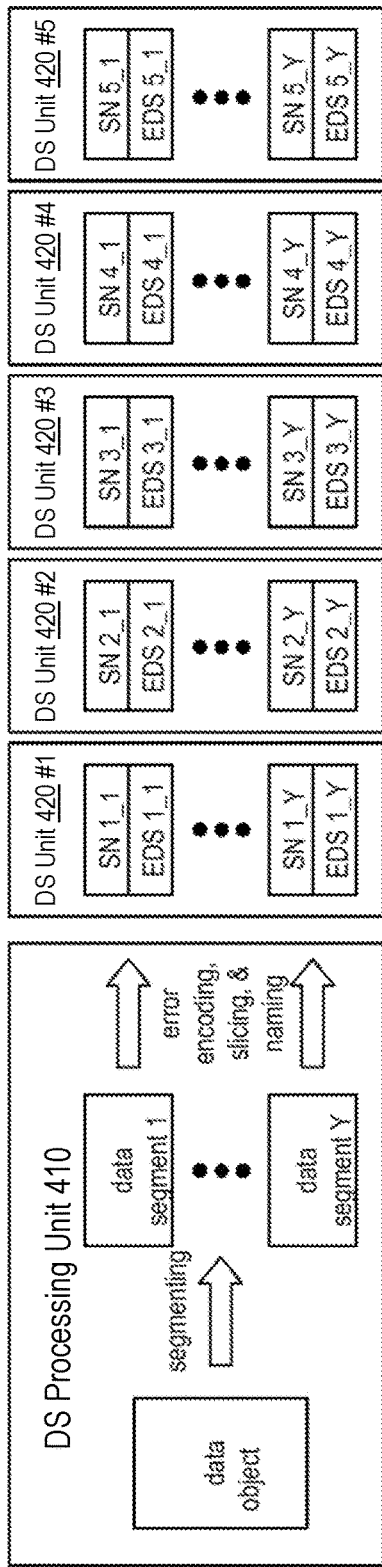
FIG. 5
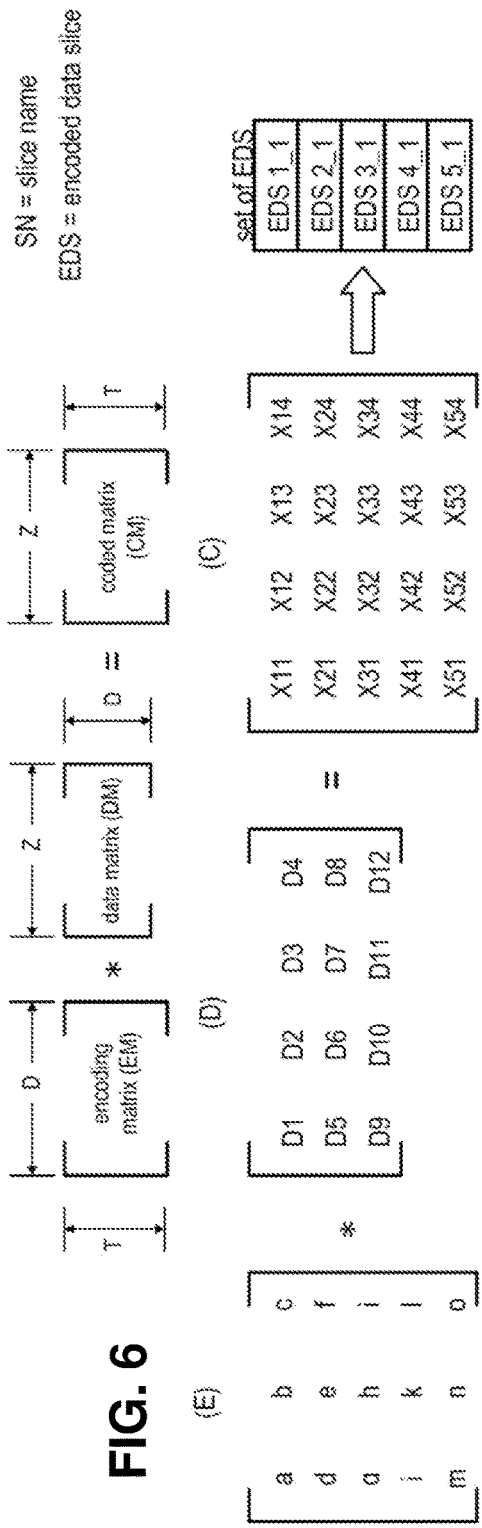
FIG. 6
FIG. 7
FIG. 8

ZONE STORAGE OPTIMIZATION USING PREDICTIVE PROTOCOL PATTERNS

BACKGROUND

Aspects of the present invention relate generally to managing operations in dispersed storage networks and, more particularly, to systems and methods for optimizing operations in a dispersed storage network based on predictive protocol patterns.

Computing devices communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

A computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop® is an open source software framework that supports distributed applications enabling application execution by thousands of computers.

In addition to cloud computing, a computer may use "cloud storage" as part of its memory system. Cloud storage enables a user, via its computer, to store files, applications, etc., on an Internet storage system. The Internet storage system may include a RAID (redundant array of independent disks) system and/or a dispersed storage system that uses an error correction scheme to encode data for storage.

SUMMARY

In a first aspect of the invention, there is a computer-implemented method including: receiving, by a computing device, data for storage in a dispersed storage network; writing, by the computing device, the data to a first location; generating, by the computing device, a first pointer to the first location; receiving, by the computing device, updated data that is an updated version of the data; writing, by the computing device, the updated data to a second location; generating, by the computing device, a second pointer to the second location; and deleting, by the computing device, the first pointer at a time after writing the updated data and generating the second pointer.

In another aspect of the invention, there is a computer program product, the computer program product comprising one or more computer readable storage media having program instructions collectively stored on the one or more computer readable storage media, the program instructions executable to: receive data for storage in a dispersed storage network; write the data to a first location; generate a first pointer to the first location; receive updated data that is an updated version of the data; write the updated data to a second location; generate a second pointer to the second location; and delete the first pointer at a time after writing the updated data and generating the second pointer.

In another aspect of the invention, there is a system for performing I/O optimization in a Zone Slice Storage (ZSS) system, the system comprising a dispersed storage unit in a dispersed storage network, the dispersed storage unit comprising a processor, a computer readable memory, one or more computer readable storage media, and program instructions collectively stored on the one or more computer readable storage media for execution by the processor. Execution of the program instructions cause the dispersed storage unit to update a current version of data with an updated version of the data by: generating a first metadata reference to a first storage location containing the current version of data; during a persist phase, generating a second metadata reference to a second storage location containing the updated version of the data; and in a finalize phase, deleting the first metadata reference.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 5 is a schematic block diagram of an example of dispersed storage error encoding of data in accordance with aspects of the present invention.

FIG. 6 is a schematic block diagram of a generic example of an error encoding function in accordance with aspects of the present invention.

FIG. 7 is a schematic block diagram of a specific example of an error encoding function in accordance with aspects of the present invention.

FIG. 8 is a schematic block diagram of an example of a slice name of an encoded data slice (EDS) in accordance with aspects of the present invention.

DETAILED DESCRIPTION

Figure 1:
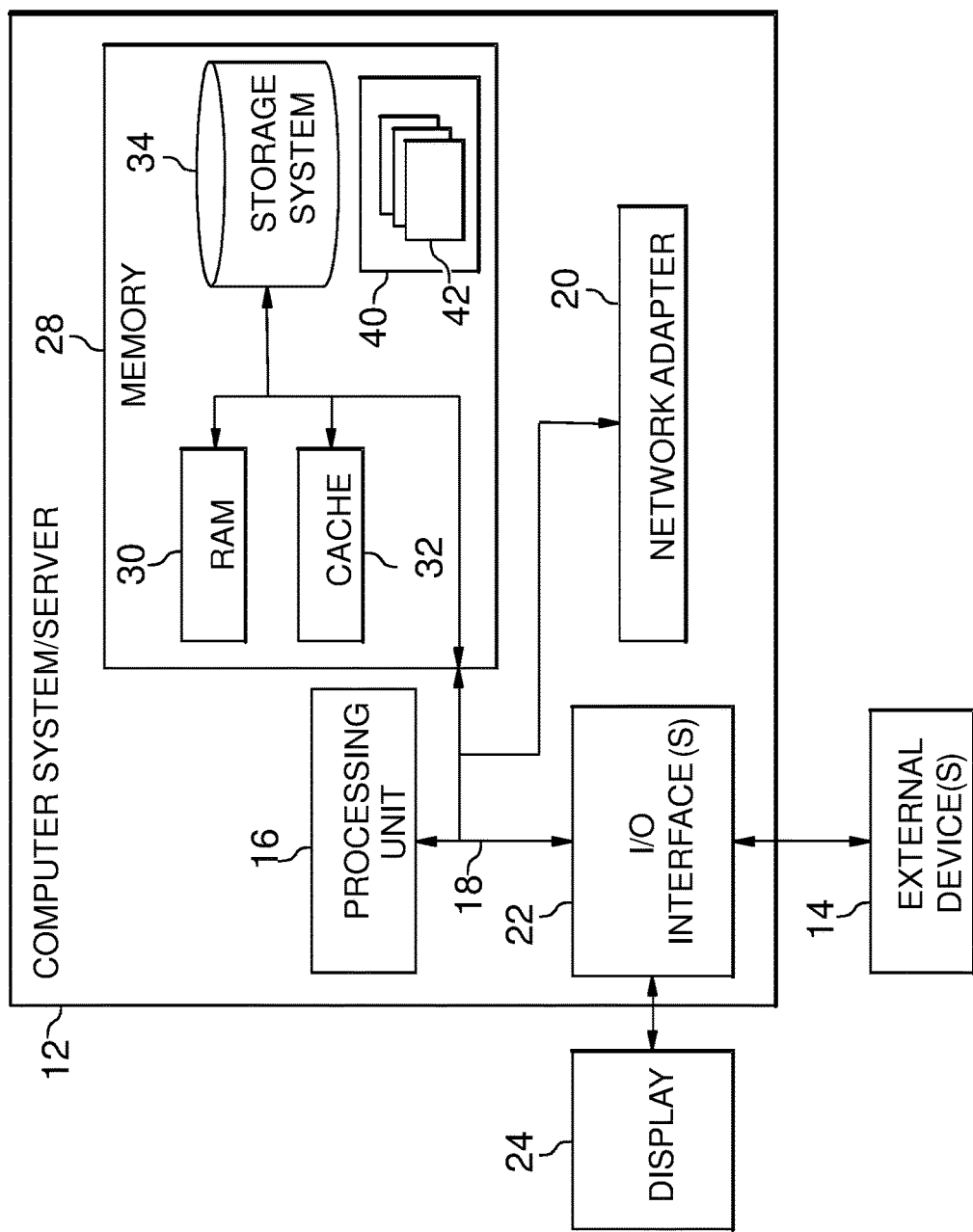
FIG. 1 depicts a cloud computing node according to an embodiment of the present invention.

Aspects of the present invention relate generally to managing operations in dispersed storage networks and, more particularly, to systems and methods for optimizing operations in a dispersed storage network based on predictive protocol patterns. Aspects of the invention are directed to a novel mechanism to perform in memory I/O (input/output) optimization based on typical protocol messages sequences and timing.

Implementations of the invention leverage patterns in application software to improve overall system performance for some most typical use cases. Taking advantage of these patterns has significant impact when optimization reduces the number of latent or highly resource consuming operations. For example, the a priori knowledge of a sequential nature of I/O allows a system to read data ahead thus reducing the actual number on disk operations. In embodiments, a similar effect can be achieved for sequential writes by delaying actual I/O in anticipation of future writes to be coalesced. In embodiments, a similar approach can be applied for more complex scenarios to improve system throughput and reduce latency. Aspects of the invention can be especially advantageous when a typical sequence of actions takes place in rapid succession and touches multiple sources whose interdependence is only known at the application layer and can't be exploited by low level components.

For example, in Zone Slice Storage, a common write pattern in the dsNet protocol is to update a single revision to a newer revision. In the original ZSS protocol, this is accomplished as a two phase write (exempting metadata updates) that includes: a persist phase (in which the system adds the new revision to all known revisions); and a finalize phase (in which the system remove revisions older than the newest persisted revision). In the original ZSS protocol, only a single pointer is used for both the old revision and the new revision (i.e., the persist phase uses a single metadata reference to a storage unit containing the old revision and the new revision, and the finalize phase uses the single metadata reference to a storage unit containing only the new revision). Due to the constraint of using only a single pointer for each data object, the original protocol necessarily includes an extra write operation (e.g., writing the old revision and the new revision together in a same media) to provide a crash-safety guarantee until a write threshold is achieved for the new revision. However, in embodiments, by writing only the new revision during the persist phase, keeping different metadata references to both the old and the new storage unit in memory, and removing the old storage unit metadata reference upon finalize, implementations of the invention reduce the number of writes necessary to update a revision and the amount of reclaimable data generated. This optimization is possible as the application is designed to make the intermediary state short lived (thus being a candidate for a memory based optimization) and the optimization can easily be detected during crash recovery, thus not compromising crash safety guarantees.

Aspects of the invention improve the functioning of a computer system and technology by increasing the efficiency of the system. In particular, aspects of the invention improve the efficiency of a dispersed storage network (DSN) generally, and improve the efficiency of a dispersed storage units (DS units) specifically, by reducing the number of I/O operations performed by a DS unit when updating a current revision of a data object to a new revision of the data object in a DSN. For example, by using different pointers for different revisions of a data object being updated, and by virtually linking the different pointers, implementations of the invention provide a same level of crash-safety guarantee as the original protocol but also advantageously omit the extra write operation of writing the old revision and the new revision together in a same media during the persist phase. In particular, during an update to a data object (e.g., from an old revision to a new revision), embodiments of the invention only perform a single write operation (i.e., writing only the new revision) as opposed to two write operations (i.e., writing the old revision and the new revision together in a same media during the persist phase, and then writing only the new revision). Since each write operation has a cost in terms of DSN resources (i.e., I/O operations of the DS unit), reducing the number of write operations during an update, in the manner described herein, has a concrete and tangible impact on the efficiency of the DS unit specifically and the DSN as a whole system. This improvement in the functioning of a computer system and technology is a practical application. Aspects of the invention are also rooted in computer technology including dispersed storage networks (DSNs), Zone Slice Storage (ZSS), and Information Dispersal Algorithms (IDAs).

In accordance with aspects of the invention, there is a method for performing I/O optimization in a Zone Slice Storage (ZSS) system, comprising updating a current revision to a new revision, wherein the updating comprises: in a persist phase, generating a single metadata reference to a storage unit containing the current revision; retaining a metadata reference to both the old and new storage units; and in a finalize phase, removing the old storage unit metadata reference.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
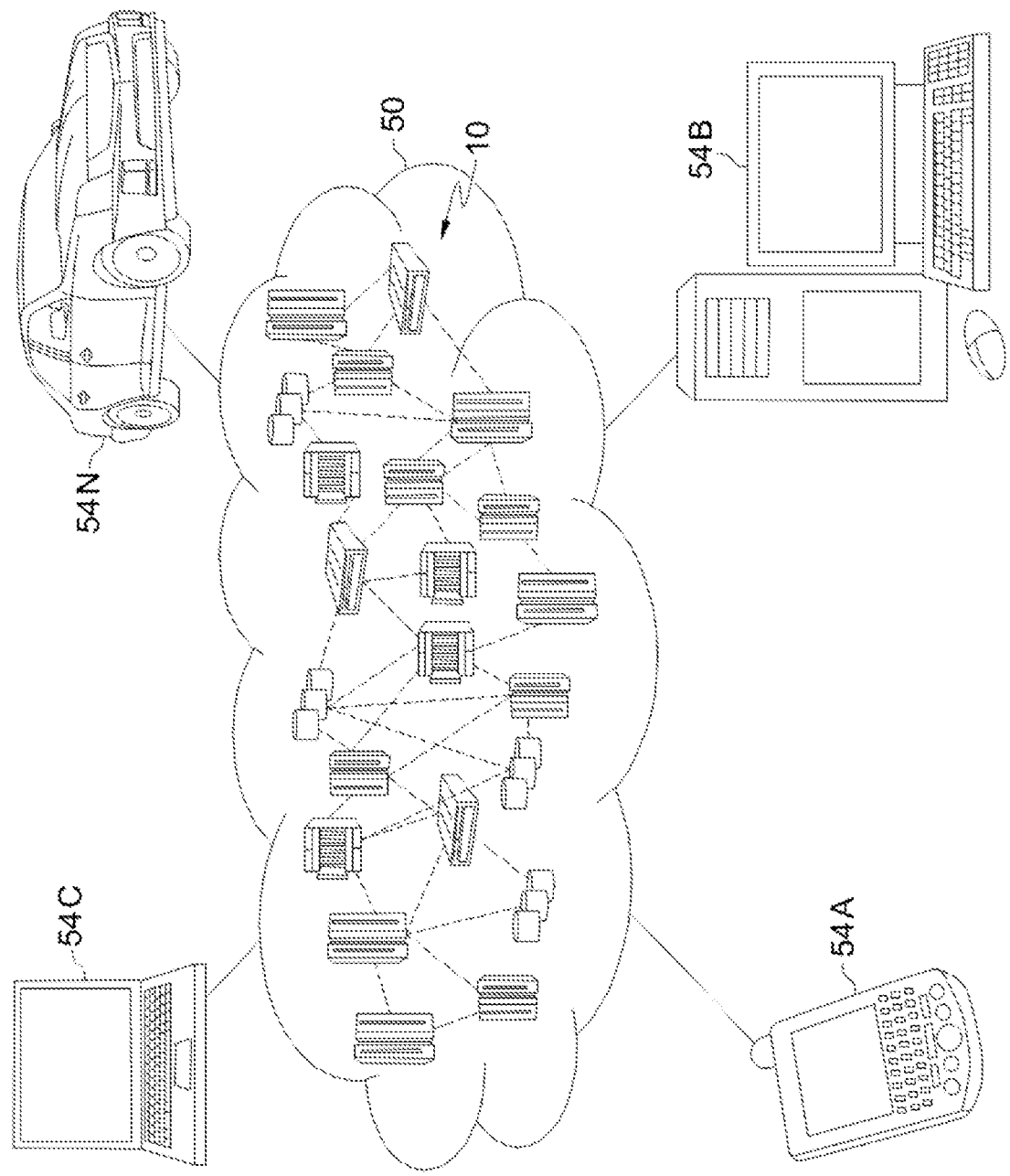
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
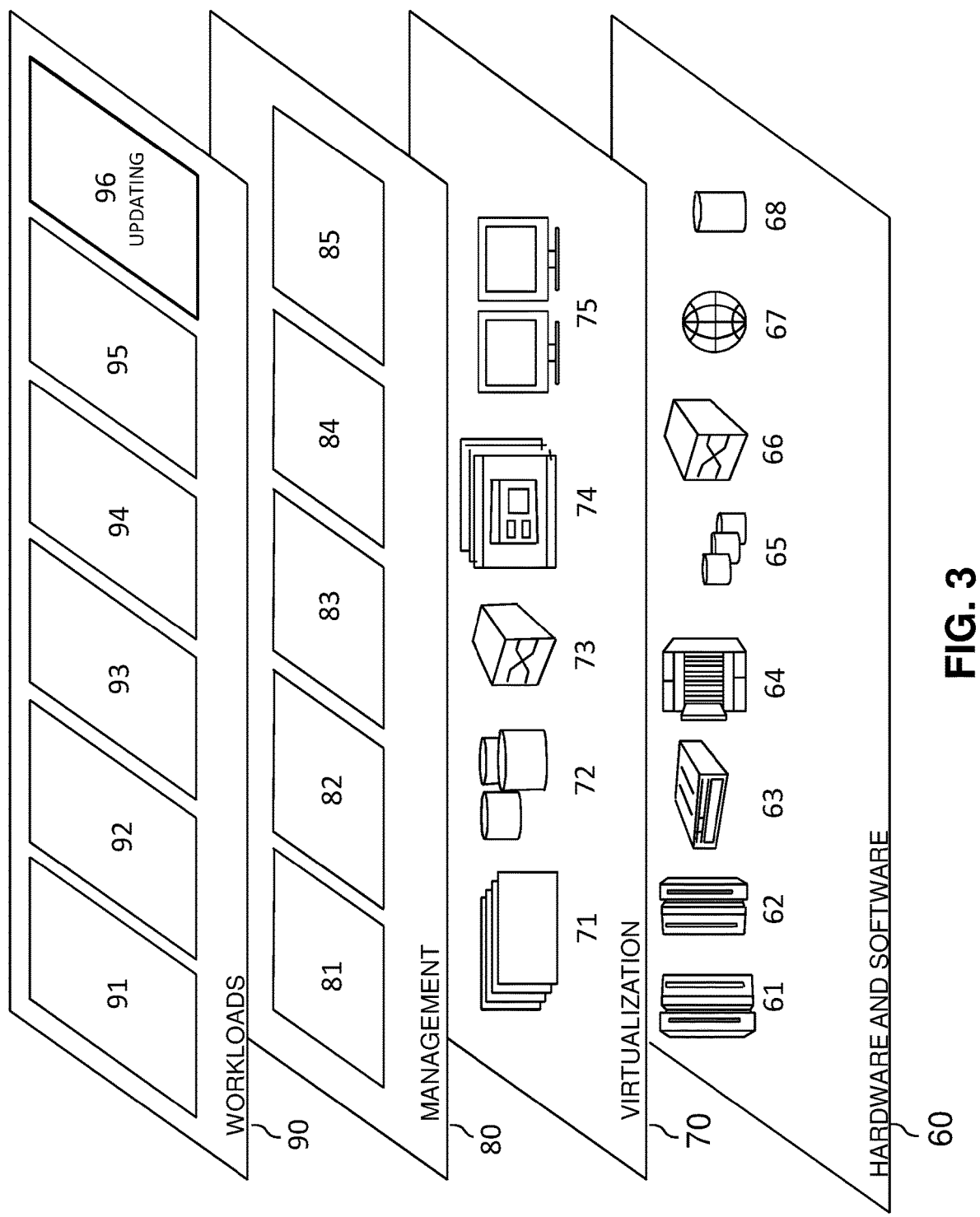
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and updating 96.

Implementations of the invention may include a computer system/server 12 of FIG. 1 in which one or more of the program modules 42 are configured to perform (or cause the computer system/server 12 to perform) one of more functions of the updating 96 of FIG. 3. For example, the one or more of the program modules 42 may be configured to: receive data for storage in a dispersed storage network; write the data to a first location; generate a first pointer to the first location; receive updated data that is an updated version of the data; write the updated data to a second location; generate a second pointer to the second location; and delete the first pointer at a time after writing the updated data and generating the second pointer.

Figure 4:
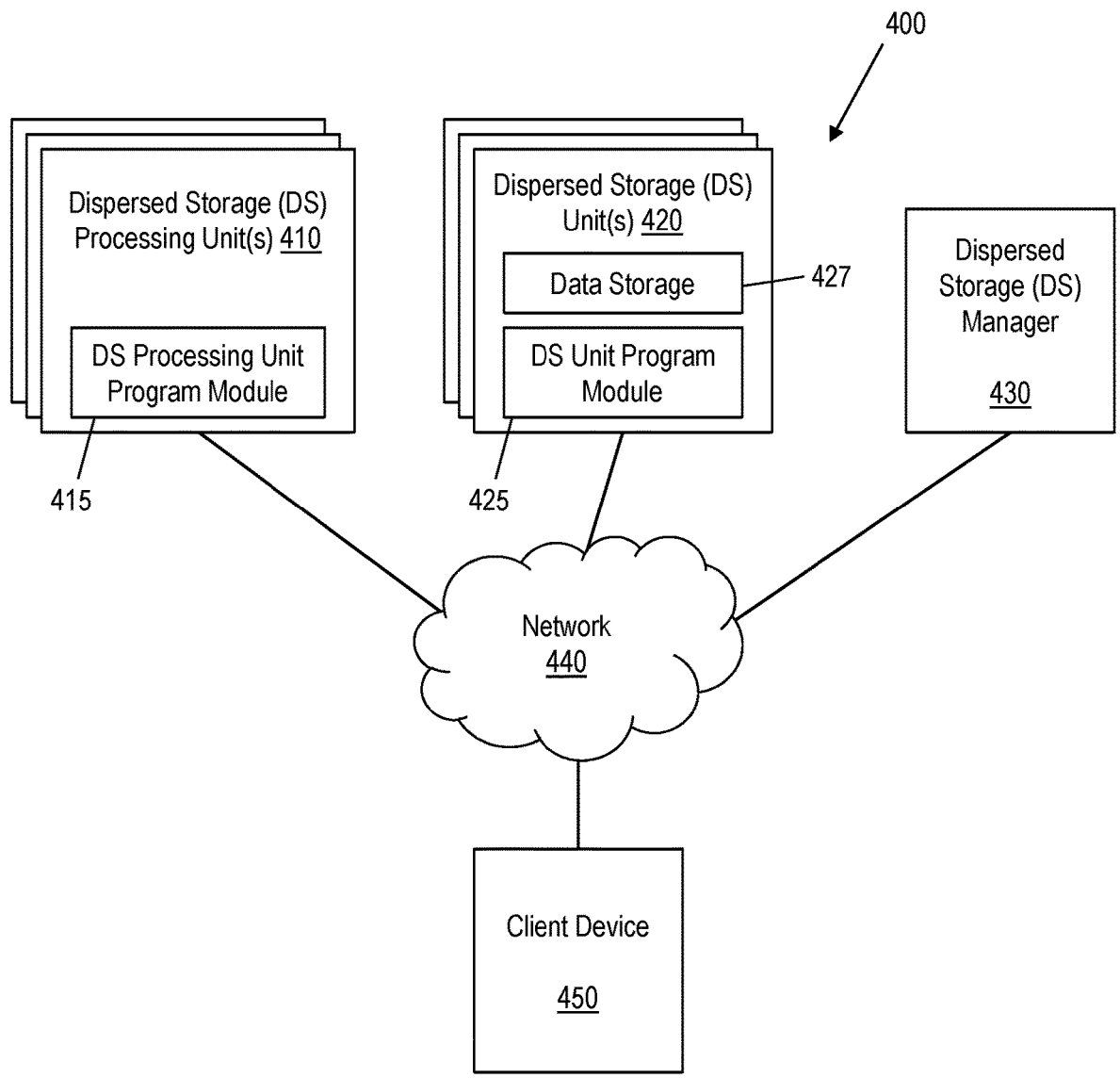
FIG. 4 shows a dispersed storage network (DSN) in accordance with aspects of the invention.

FIG. 4 shows a dispersed storage network 400 (referred to as DSN or dsNet) in accordance with aspects of the invention. In embodiments, the DSN 400 comprises plural dispersed storage processing units 410 (DS processing units), plural dispersed storage units 420 (DS units), and at least one dispersed storage manager 430 (DS manager). The DS processing units 410, the DS units 420, and the DS manager 430 all communicate via a network 440, which comprises one or more computer networks such as a LAN, WAN, and the Internet. In a cloud implementation, the network 440 is a cloud computing environment 50 of FIG. 2, and each of the DS processing units 410, the DS units 420, and the DS manager 430 are nodes 10 in the cloud computing environment 50.

In accordance with aspects of the invention, the DSN 400 stores data using object storage technology, which uses Information Dispersal Algorithms (IDAs) to separate a data object into slices that are distributed to plural ones of the DS units 420. As used herein, a slice is a dispersed piece of encoded data. Slices are created from an original data object and can be used to recreate the original data object. In particular, the DSN 400 creates slices using a combination of erasure coding, encryption, and dispersal algorithms. The erasure coding generates 'extra' slices for each data object, such that the data object can be recreated from a subset (less than all of) the total number of slices that are stored for this data object. By dividing a data object into slices and storing the slices at plural different DS units 420, the DSN 400 ensures that no single one of the DS units 420 has all the slices that are necessary to recreate the data object. Moreover, by creating extra slices for each data object, the DSN 400 can tolerate multiple failures without losing the ability to recreate the original data object, e.g., from the available slices.

According to aspects of the invention, the DS manager 430 provides a management interface that is used for system administrative tasks, such as system configuration, storage provisioning, and monitoring the health and performance of the system. The DS manager 430 may comprise a physical device (e.g., a computer device such as computer system/server 12 of FIG. 1), a virtual machine (VM), or a container (e.g., a Docker container). The term "Docker" may be subject to trademark rights in various jurisdictions throughout the world and is used here only in reference to the products or services properly denominated by the mark to the extent that such trademark rights may exist.

According to aspects of the invention, the DS processing units 410 are configured to encrypt and encode data during a write operation, to manage the dispersal of slices of data during a write operation, and to decode and decrypt data during a read operation. In one example, during a write operation, one or more of the DS processing units 410 are configured to generate data slices for storage by performing a dispersed storage error encoding function on a set of data segments for storage, where the encoded data slices of a data segment are transmitted to an information dispersal algorithm (IDA) width threshold number of DS units 420. In this example, during a read operation, one or more of the DS processing units 410 are configured to recover a data segment by retrieving at least an IDA decode threshold number of encoded data slices from at least a corresponding IDA decode threshold number of DS units 420, and by performing a dispersed storage error decoding function on the received encoded data slices.

In embodiments, the DS processing units 410 are stateless components that present a storage interface to a client application and that transform data objects into slices using an IDA. Each DS processing unit 410 may comprise a physical device (e.g., a computer device such as a computer system/server 12 of FIG. 1), a virtual machine (VM), or a container (e.g., a Docker container).

In embodiments, each DS processing unit 410 comprises a DS processing unit program module 415 that is configured to perform processes of the DS processing unit 410 as described herein, e.g., encrypt and encode data during a write operation, manage the dispersal of slices of data during a write operation, and decode and decrypt data during a read operation, etc. The DS processing unit program module 415 may comprise one or more program modules 42 as described with respect to FIG. 1.

According to aspects of the invention, the DS units 420 are configured to store the data slices that are received from a DS processing unit 410 during a write, and to return data slices to a DS processing unit 410 during a read. Each DS unit 420 may comprise a physical device (e.g., a computer device such as a computer system/server 12 of FIG. 1), a virtual machine (VM), or a container (e.g., a Docker container).

In embodiments, each DS unit 420 comprises DS unit program module 425 and data storage 427. The DS unit program module 425 may comprise one or more program modules 42 as described with respect to FIG. 1, and is configured to perform processes of the DS unit 420 as described herein, e.g., store data slices that are received from a DS processing unit 410 during a write, return data slices to a DS processing unit 410 during a read, perform compaction of data in the data storage 427, update a version of data stored in the data storage 427, etc.

In embodiments, the data storage 427 receives and stores data in accordance with instructions received from the DS unit program module 425. The data storage 427 is one or more of any type or combination of types of data storage medium, data storage device, or system (e.g., storage device 65 of FIG. 3) and is located on (or is accessible to) the DS unit 420. For example, the data storage 427 may include one or more hard drives, SMR (Shingled Magnetic Recording) drives, solid state drives (SSDs), Tape Drives, and other memory devices.

In implementations, a client device 450 runs a client application that communicates with one of the DS processing units 410 to perform data operations in the DSN 400. In embodiments, the client application uses application programming interfaces (APIs) to perform data operations in the DSN 400. In one example, a first API call (e.g., PUT) writes a data object to the DSN 400, a second API call (e.g., GET) reads a data object from the DSN 400, a third API call (e.g., DELETE) deletes a data object from the DSN 400, and a fourth API call (e.g., LIST) lists all the data objects in a bucket in the DSN 400. In embodiments, the client device 450 comprises a computer device such as a laptop computer, desktop computer, tablet computer, etc., and may comprise one or more components of the computer system/server 12 of FIG. 1. In embodiments, the client application running on the client device 450 is a software application, and may comprise one or more program modules 42 as described with respect to FIG. 1. In embodiments, the client device 450 communicates with one of the DS processing units 410 via the network 440.

FIGS. 5-10 illustrate an exemplary operation of the DSN 400. FIG. 5 is a schematic block diagram of an example of dispersed storage error encoding of data. When a DS processing unit 410 has data to store it disperse storage error encodes the data in accordance with a dispersed storage error encoding process based on dispersed storage error encoding parameters. Here, the computing device stores a data object, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 6 and a specific example is shown in FIG. 7); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the DS processing unit 410 divides data object into a plurality of fixed sized data segments (e.g., 1 through Y of a fixed size in range of Kilo-bytes to Tera-bytes or more). The number of data segments created is dependent of the size of the data and the data segmenting protocol.

The DS processing unit 410 then disperse storage error encodes a data segment using the selected encoding function (e.g., Cauchy Reed-Solomon) to produce a set of encoded data slices. FIG. 6 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 7 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 5, the computing device also creates a slice name (SN) for each encoded data slice (EDS) in the set of encoded data slices. A typical format for a slice name 480 is shown in FIG. 8. As shown, the slice name (SN) 480 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory.

As a result of encoding, the DS processing unit 410 produces a plurality of sets of encoded data slices, which are provided with their respective slice names to the storage units (DS unit 420 numbers one through five in this example) for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 9:
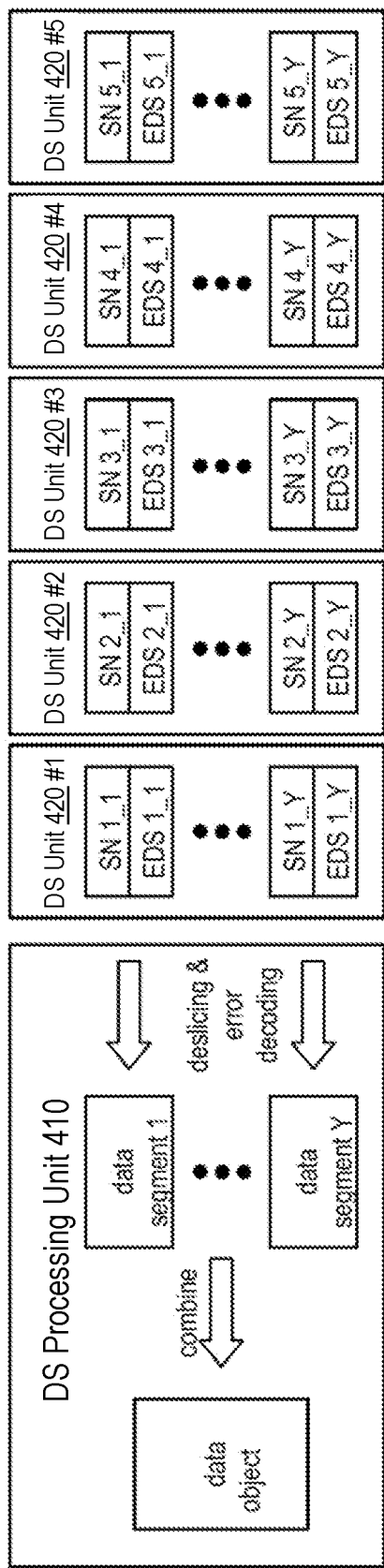
FIG. 9 is a schematic block diagram of an example of dispersed storage error decoding of data in accordance with aspects of the present invention.

FIG. 9 is a schematic block diagram of an example of dispersed storage error decoding of a data object that was dispersed storage error encoded and stored in the example of FIG. 6. In this example, the DS processing unit 410 retrieves from the storage units at least the decode threshold number of encoded data slices per data segment. As a specific example, the computing device retrieves a read threshold number of encoded data slices.

Figure 10:
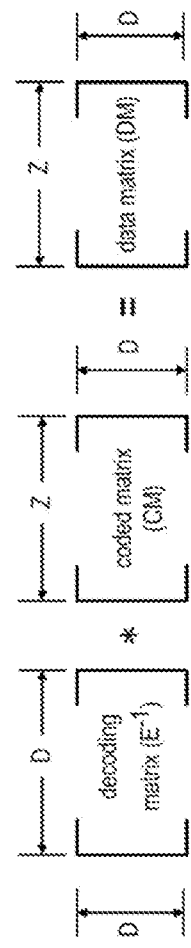
FIG. 10 is a schematic block diagram of a generic example of an error decoding function in accordance with aspects of the present invention.

To recover a data segment from a decode threshold number of encoded data slices, the computing device uses a decoding function as shown in FIG. 10. As shown, the decoding function is essentially an inverse of the encoding function of FIG. 6. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In accordance with aspects of the invention, each DS unit 420 uses Zone Slice Storage (ZSS) to store data in its data storage 427. ZSS is a storage paradigm that is implemented by the DS unit program module 425 at each DS unit 420. In ZSS, the DS unit program module 425 defines zones of fixed size (e.g., typically 256 MB) in the storage media (e.g., data storage 427). In embodiments, the DS unit program module 425 sequentially stores slices received from DS processing units 410 in zones, with many slices from many different data objects being stored together in a respective zone. In embodiments, the DS unit program module 425 utilizes a fully sequential write protocol. For example, a storage unit (e.g., DS unit 420) can be implemented by utilizing Append Only Storage Devices (AOSD) or other memory devices for which appended writes are the optimal form of access, and/or for which an append-only write scheme is utilized when storing data. The append-only write scheme dictates that new data slices are written by being appended to an end, or "append point" of a zone in storage, such as a storage zone. As data slices are written, they are written to the next space in their respective zone of memory according to the corresponding append point of the zone, and the append point is updated based on the length of newly written data. Append points for each zone can be maintained in a volatile memory such as RAM or other memory of the storage unit, and can be stored as a pointer or other reference to the append point location of the memory device.

The storage unit (e.g., DS unit 420) can dynamically allocate new zones and un-allocate old zones of one or more memory devices to maintain a fixed number of active zones and/or a number of active zones that is determined to be optimal. The number of zones and/or the zones selected in the subset can be determined based on zone allocation parameters and/or zone reallocation parameters, which can be based on I/O request frequency, memory and/or processing requirements, I/O speed requirements, and/or other zone allocation and/or reallocation requirements. Selecting a smaller subset of zones open for write can further minimize seeking and thus improve I/O speed. In some embodiments, exactly one zone per memory device is open for writing at any given time. This can eliminate seeking on each memory device as writing is fully sequential on each memory device. In various embodiments, the active zone can be selected based on available space in the zone, based on a previously selected zone, and/or selected randomly. The storage unit can maintain information regarding which zones are designated as open to writes and/or reads, and which zones are closed to writes and/or reads, and can change these designations in response to determining a reallocation requirement is met. The storage unit can also maintain zone priority information and/or available capacity information for each of the zones. This information can be stored in RAM or other memory of the storage unit.

The allocation of zones that are open for writing provides a significant and advantageous distinction of ZSS systems compared to Packed Slice Storage (PSS) systems. PSS operates with multiple active files concurrently open for writing on each disk, which disadvantageously causes disk head thrashing due to continuous seeking back and forth between the open files. ZSS, on the other hand, eliminates such thrashing by greatly reducing the number of open zones per disk, in some preferred embodiments even constraining a system to have only one zone open at a time on a particular disk. Another distinction between ZSS and PSS is that ZSS is highly compatible with SMR drives. For example, ZSS can be used to define zones in an SMR drive where each defined zone of the ZSS maps directly to a physical zone of the SMR drive. In a particular exemplary embodiment, the data storage 427 is a 10 terabyte SMR drive, and the DS unit program module 425 uses ZSS to define 10,000 zones each of 256 megabytes in the SMR drive, where each of the ZSS defined zones is mapped directly to a physical zone of the SMR drive. PSS, on the other hand, does not work well with SMR drives. One reason for this is that SMR drives support sequential writes only, but the file system of PSS does not guarantee that slice file writes are sequential. Another reason is that the slice name catalog in PSS is not written sequentially.

The sequential write requirement of Append Only Storage Devices affects the protocol for revising a data object: as opposed to the original object being overwritten with a revised data object in its original location, revised data objects are appended at a new memory location based on the append point. This means that during a slice-overwrite of a new slice revision, there will necessarily be two simultaneous instances of the slice at the same time: the original slice written to a first location, and the newly written slice written to a second location defined by the append point. The location of the original object is invalid for future writing, and that space in memory is reclaimed when a garbage collection routine is performed, e.g., via compaction.

In the original ZSS protocol, when a slice is updated (e.g., because the data object associated with the slice was updated by an external user or by an application internal to the DSN), the DS unit writes the original slice and the new slice together at a second location in the data storage 427 (the original slice already existing at a first location in the data storage 427), and then the DS unit writes the new slice (alone) at a third location in the data storage 427. In the original ZSS protocol, only one pointer is used for each data object. As a result of this constraint, during the slice update described above, at time t1 the single pointer points at the first location (containing only the original slice) prior to the update. Then at time t2 after time t1, the system modifies this same pointer to point to the second location (containing another copy of the original slice and the new slice) during the persist phase and until a write threshold is achieved for the new slice. Then at time t3 after time t2, the system modifies this same pointer to point to the third location (containing another copy of the new slice).

The original ZSS protocol performs this sequence of steps during a slice update, including the intermediate step of writing a copy of the original slice and the new slice together at a same disk location, in order to provide crash safety for the stored data, as is understood by those of skill in the art. However, this procedure is inefficient for a number of reasons. First, this procedure causes a tripling of the amount of I/O to the memory device: instead of merely writing the new slice once, this procedure writes the new slice twice (once at each of the second and third locations) and writes another copy of the original slice (at the second location). This tripling the amount of I/O has a negative impact on the efficiency of the DS unit specifically and the DSN as a whole. Second, the intermediate step of writing a copy of the original slice and the new slice together at a same disk location used in this procedure increases the amount of unused disk space that will later be reclaimed, and thus increases the frequency at which disk space must be reclaimed. For example, after the slice update, the system will reclaim the disk space occupied by the original slice at the first location and also by the copy of the original slice and the new slice together at the second location. Since such reclamation has a cost in terms of DSN resources (i.e., both CPU and I/O operations of the DS unit), increasing the frequency of such reclamation has a negative impact on the efficiency of the DS unit specifically and the DSN as a whole.

Implementations of the invention address these problems of the original ZSS protocol by performing a slice update that does not include the intermediate step of writing a copy of the original slice and the new slice together at a same disk location. Implementations of the invention accomplish this by defining and using different pointers for the original slice and the new slice during the slice update, as opposed to using a same pointer for both the original slice and the new slice. In embodiments, a slice is provided with a unique pointer when it is written to a location in the data storage 427. In embodiments, when that original slice is updated (e.g., because the data object associated with the slice was updated by an external user or by an application internal to the DSN), the DS unit writes the new slice at a second location in the data storage 427 and provides a unique pointer to the new slice, the pointer of the new slice being different than the pointer of the original slice. In embodiments, the system maintains the original slice and its first pointer concurrently with the new slice and its second pointer until such a time as the system determines that the new slice is durably written (e.g., reaches a write threshold). Maintaining both slices and their respective pointers provides crash safety for the stored data, as should be understood by those of skill in the art. After the system determines that the new slice is durably written, the system then deletes the first pointer to the original slice. In this manner, the original slice is no longer considered to be "live" data, and the disk space occupied by the original slice will be reclaimed in the normal processes of the DSN.

In embodiments, each pointer constitutes a metadata reference that contains information including: information about the memory device in the data storage 427 (e.g., disk name, such as SMR drive name), an identifier of a ZSS zone the respective slice is written in, and a location of the slice within the zone. In this manner, the system maintains a respective metadata reference for each of the original slice and the new slice during the persist phase, and then deletes the metadata reference of the original slice in the finalize phase, and thus reduces the number of writes used to update a revision as well as the amount of reclaimable data generated. In further embodiments, the system creates a data structure that defines a virtual link between the first pointer to the original slice of the second pointer to the new slice, and maintains the virtual link until the first pointer is deleted as described above. In embodiments, the system uses the virtual link to recover the data in the event of a system crash after starting the update but prior to deleting the first pointer.

Figure 11A:
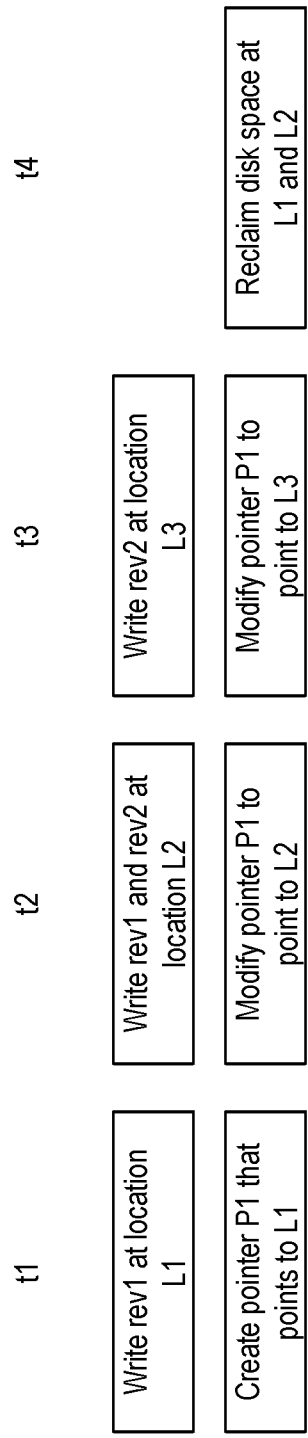
FIG. 11A illustrates a process of updating data.
Figure 11B:
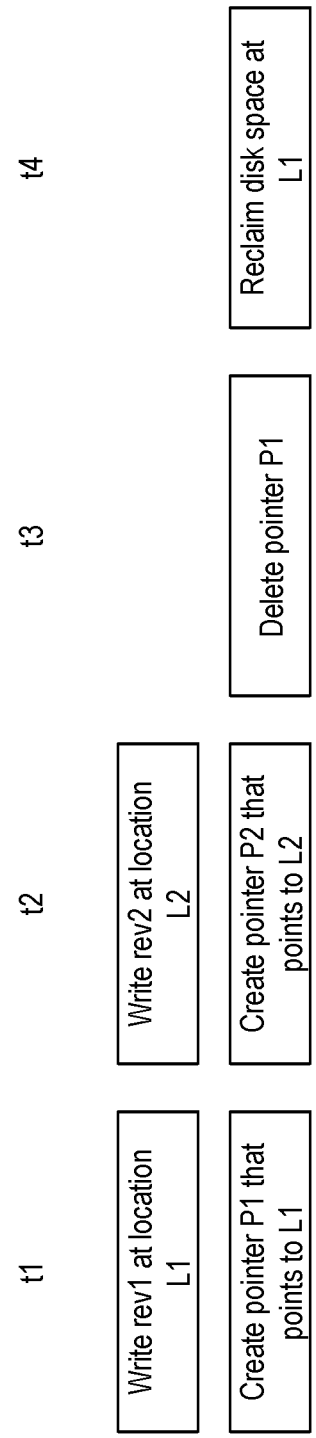
FIG. 11B illustrates a process of updating data in accordance with aspects of the invention.

FIG. 11A illustrates a process of updating data in accordance with the original ZSS protocol, and FIG. 11B illustrates a process of updating data in accordance with aspects of the invention. In FIGS. 11A and 11B, t1 is a first time, t2 is a second time after t1, t3 is a third time after t2, and t4 is a fourth time after t3. In FIGS. 11A and 11B, rev1 is original data and rev2 is a revision (e.g., update) of the original data. In a particular exemplary implementation, rev1 and rev2 are slices of a data object, the slices being received by a DS unit 420 from a DS processing unit 410 as described herein.

As shown in FIG. 11A, in the original ZSS protocol, at time t1 the DS unit 420 receives rev1 and writes rev1 to a first location L1 in the data storage 427 (e.g., to a first location in a zone in a disk such as an SMR drive). Also at time t1, the DS unit creates a pointer P1 that points to the location L1. Subsequently, the DS unit receives updated data (e.g., rev2) and an instruction to update the original data with updated data. In response to this, at time t2, the DS unit writes another copy of rev1 and rev2 together at a same location L2, which may be different than the first location L1, without deleting the copy of rev 1 at location L1. Also at time t2, the DS unit modifies the exiting pointer P1 to point to location L2. Subsequently, at time t3 the DS unit writes another copy of rev2 at another location L3, without deleting the copies of rev1 and rev2 at L2. After determining that the write of rev2 at location L3 is durable, the DS unit modifies the pointer P1 to point to location L3. At this point, the disk space at locations L1 and L2 is unused. Accordingly, at time t4, the DS unit reclaims the disk space of L1 and L2. The reclaiming may occur at different times and in different reclaim processes. For example, L1 and L2 might be in different zones that are reclaimed at different times sometime after t3.

As shown in FIG. 11B, in embodiments of the present invention, at time t1 the DS unit receives rev1 and writes rev1 to a first location L1 in the data storage 427 (e.g., to a first location in a zone in a disk such as an SMR drive). Also at time t1, the DS unit creates a pointer P1 that points to the location L1. Subsequently, the DS unit receives updated data (e.g., rev2) and an instruction to update the original data with updated data. Accordingly, at time t2, the DS unit writes rev2 to a second location L2 in the data storage 427 and creates a pointer P2 that points to the location L2. At time t3, after determining that the write of rev2 is durable, the DS unit deletes the pointer P1. At this point, the disk space at location L1 is unreferenced since no pointer points to it. Accordingly, at time t4, the DS unit reclaims the disk space of L1. As can be appreciated from FIGS. 11A and 11B, the update process in accordance with aspects of the invention uses less I/O operations (i.e., less writes to disk) and requires less disk reclaiming compared to the original ZSS protocol.

Figure 12:
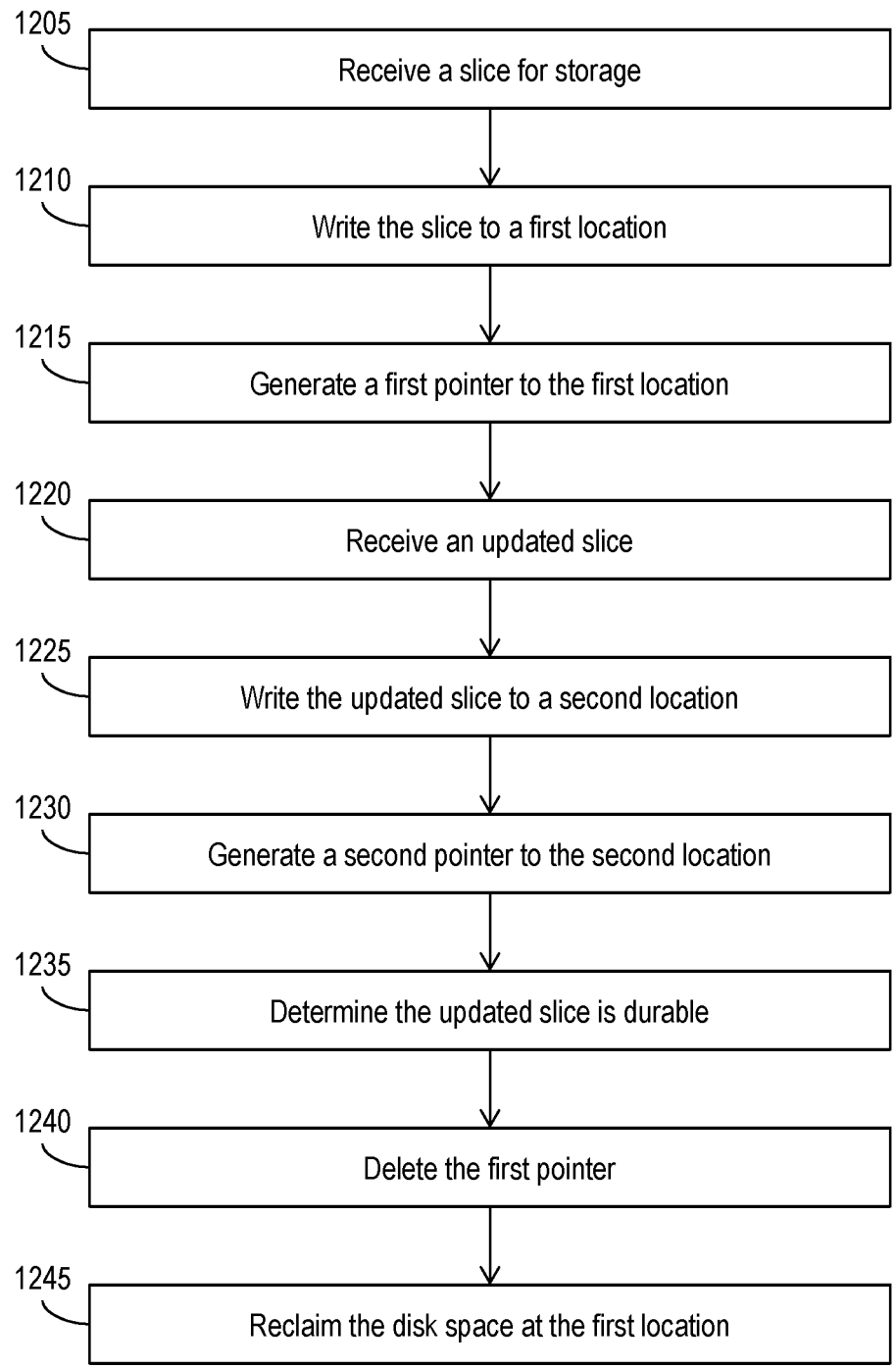
FIG. 12 shows a flowchart of an exemplary method in accordance with aspects of the invention.

FIG. 12 depicts a flowchart of an exemplary method in accordance with aspects of the invention. In embodiments, the steps of the method are performed in the environment of FIGS. 4-10 and are described with reference to the elements shown in FIGS. 4-10.

At step 1205, the DS unit 420 receives a slice for storage. In embodiments, and as described with respect to FIGS. 4-10, the DS unit 420 receives a slice from a DS processing unit 410. The slice may be associated with a data object received from a client device 450, or may be associated with an internal data object created within the DSN.

At step 1210, the DS unit 420 writes the slice to a first location. In embodiments, and as described with respect to FIGS. 4-10, the DS unit program module 425 sequentially writes this slice (from step 1205) to a first location in a zone defined in the data storage 427 by appending it to an end (or append point) of the zone. In a particular exemplary embodiment, the DS unit 420 employs ZSS and the data storage 427 comprises at least one SMR drive, and the first location is a ZSS defined zone of the at least one SMR drive.

At step 1215, the DS unit 420 generates a first pointer to the first location. In embodiments, and as described with respect to FIGS. 4-10, the first pointer is a metadata reference that includes information such as: information about the memory device in the data storage 427 (e.g., disk name, such as SMR drive name), an identifier of a ZSS zone the respective slice is written in, and a location of the slice within the zone. In embodiments, the DS unit 420 maintains the first pointer in RAM.

At step 1220, the DS unit 420 receives an updated slice for storage. In embodiments, and as described with respect to FIGS. 4-10, the DS unit 420 receives the updated slice from a DS processing unit 410. As described herein, the updated slice is an update of the original slice from step 1205, and may be generated, for example, when an external user or the system revises a data object from which the original slice was created. Step 1220 may include the DS processing unit 410 providing an instruction to the DS unit that identifies the original slice from step 1205 (e.g., by slice name), where the instruction instructs the DS unit 420 to replace the original slice from step 1205 with the new slice received at step 1220.

At step 1225, the DS unit 420 writes the updated slice to a second location. In embodiments, and as described with respect to FIGS. 4-10, the DS unit program module 425 sequentially writes this updated slice (from step 1220) to a second location in a zone defined in the data storage 427 by appending it to an end (or append point) of the zone. In a particular exemplary embodiment, the DS unit 420 employs ZSS and the data storage 427 comprises at least one SMR drive, and the second location is a ZSS defined zone of the at least one SMR drive. In some instances, the first zone might be the same as the second zone. In other instances, the first zone and the second zone are different zones. In either event, the system writes the updated slice to a second location that is different than the first location. In this manner, the original slice and the update slice are both are stored in data storage 427 concurrently for a period of time.

At step 1230, the DS unit 420 generates a second pointer to the second location. In embodiments, and as described with respect to FIGS. 4-10, the second pointer is a metadata reference that includes information such as: information about the memory device in the data storage 427 (e.g., disk name, such as SMR drive name), an identifier of a ZSS zone the updated slice is written in, and a location of the updated slice within the zone. In embodiments, the second pointer is different than the first pointer, and the first pointer and second pointer exist concurrently during a persist phase of the update. In embodiments, the second pointer is generated anew, and is not a modification of an existing pointer. In embodiments, the DS unit 420 maintains the second pointer in RAM.

At step 1235, the DS unit 420 determines the updated slice is durable. In embodiments, and as described with respect to FIGS. 4-10, the DS unit program module 425 determines that the updated slice is durable based on achieving a write threshold for the updated slice.

At step 1240, the DS unit 420 deletes the first pointer. In embodiments, and as described with respect to FIGS. 4-10, the DS unit program module 425 deletes the first pointer, e.g., from RAM or other memory that stores the first pointer. When the first pointer is deleted, the disk location that was indicated in the first pointer becomes an unreferenced location, e.g., a hole, that will be subject to reclaiming.

At step 1245, the DS unit 420 reclaims the disk space at the first location. In embodiments, and as described with respect to FIGS. 4-10, the DS unit program module 425 determines that the zone containing the first location reaches threshold for compaction. The threshold may be, for example, a threshold amount space in the zone occupied by holes. Upon making this determination, the DS unit program module 425 reads the entire zone, and moves all the live slices from zone being reclaimed to another zone. Fully sequential writing and the log-based data structure employed in ZSS leads to unreferenced space in zones when, for example, a slice that is stored in a zone is subsequently revised or deleted. Such unreferenced space is referred to as holes, and ZSS uses compaction to reclaim the space occupied by holes. To reclaim space in a zone that has both holes and live data (i.e., slices that are not revised or deleted), the storage unit (e.g., DS unit 420) reads the entire zone and sequentially writes the live data in a new zone, with no holes. The live data is compacted in the new zone, and the initial zone is released for future allocation (e.g., for sequentially writing new incoming slices in the entirety of this zone). In this manner, the storage unit reclaims the unreferenced space that was occupied by the holes in the initial zone. The amount of space reclaimed depends on how much unreferenced space is in a zone.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device, data comprising a slice of a data object for storage in a dispersed storage network having plural dispersed storage units, each of the plural dispersed storage units comprising a container;
writing, by the computing device, the data to a first location at an append point of a physical zone in the dispersed storage network;
generating, by the computing device, a first pointer to the first location;
receiving, by the computing device, updated data that is an updated version of the data;
writing, by the computing device, the updated data to a second location at the append point of the physical zone in the dispersed storage network;
generating, by the computing device, a second pointer to the second location, wherein the second pointer is generated anew after receiving the updated data is not a modification of an existing pointer;
creating a data structure that defines a virtual link between the first pointer and the second pointer, wherein the virtual link is usable to recover the data in the event of a system crash that occurs prior to the deleting the first pointer;
determining the updated data is durable, wherein the determining the updated data is durable comprises determining a write threshold is achieved for the updated data;
deleting, by the computing device, the first pointer at a time after writing the updated data and generating the second pointer; and
reclaiming disk space at the first location after deleting the first pointer, wherein the reclaiming comprises a compaction process that the computing device performs in response to determining that a zone containing the first location reaches a threshold for compaction, wherein:
the one of the plural dispersed storage units comprises data storage that comprises at least one drive;
the one of plural dispersed storage units uses Zone Slice Storage (ZSS);
the first location and the second location are in respective ZSS zones of the at least one drive of the data storage; and
the first pointer and the second pointer each comprise a respective metadata reference that includes: information about the data storage; an identifier of the respective ZSS zone; and a location within the respective ZSS zone.

2. The method of claim 1, wherein the deleting is performed in response to the determining the updated data is durable, and further comprising maintaining the virtual link until the first pointer is deleted.

3. The method of claim 1, wherein:
the first pointer is generated prior to the receiving the updated data; and
the first pointer and the second pointer are different pointers that exist concurrently for an amount of time.

4. The method of claim 1, wherein the computing device is one of plural dispersed storage units in the dispersed storage network.

5. The method of claim 4, wherein the slice comprises an encoded data slice received by the one of the plural dispersed storage units from one of plural dispersed storage processing units in the dispersed storage network.

6. A computer program product, the computer program product comprising one or more computer readable storage media having program instructions collectively stored on the one or more computer readable storage media, the program instructions executable to:
receive data comprising an encoded data slice of a data object for storage in a dispersed storage network having plural dispersed storage units, each of the plural dispersed storage units comprising a virtual machine;
write the data to a first location, wherein the first location is a first zone of at least one Shingled Magnetic Recording (SMR) drive;
generate a first pointer to the first location;

receive updated data that is an updated version of the data;

write the updated data to a second location, wherein the second location is a second zone of the at least one SMR drive;

generate a second pointer to the second location, wherein the second pointer is generated anew after receiving the updated data and is not a modification of an existing pointer;

create a data structure that defines a virtual link between the first pointer and the second pointer, wherein the virtual link is usable to recover the data in the event of a system crash that occurs prior to the deleting the first pointer;

determine the updated data is durable, wherein the determining the updated data is durable comprises determining a write threshold is achieved for the updated data;

delete the first pointer at a time after writing the updated data and generating the second pointer; and reclaim disk space at the first location after deleting the first pointer and in response to determining that a zone containing the first location reaches a threshold for compaction, wherein:

the data is received by a dispersed storage unit of the plural dispersed storage units from a dispersed storage processing unit in the dispersed storage network;

the dispersed storage unit comprises data storage that comprises at least one drive;

the dispersed storage unit uses Zone Slice Storage (ZSS);

the first location and the second location are in respective ZSS zones of the at least one drive of the data storage; and the first pointer and the second pointer each comprise a respective metadata reference that includes: a name of the at least one SMR drive; an identifier of the respective ZSS zone; and a location within the respective ZSS zone.

7. The computer program product of claim 6, wherein the deleting the first pointer is performed in response to determining the updated data is durable.

8. The computer program product of claim 6, wherein:

the first pointer is generated prior to the receiving the updated data and prior to the generating the second pointer; and the first pointer and the second pointer are different pointers that exist concurrently for an amount of time.

9. A system for performing I/O optimization in a Zone Slice Storage (ZSS) system, the system comprising:

a dispersed storage unit in a dispersed storage network, the dispersed storage unit comprising a processor, a computer readable memory, one or more computer readable storage media, and program instructions collectively stored on the one or more computer readable storage media for execution by the processor, wherein execution of the program instructions cause the dispersed storage unit to update a current version of data with an updated version of the data by:

generating a first metadata reference to a first storage location containing the current version of data;

during a persist phase, generating a second metadata reference to a second storage location containing the updated version of the data, wherein the second metadata reference is generated anew during the persist phase and is not a modification of an existing metadata reference;

creating a data structure that defines a virtual link between the first metadata reference and the second metadata reference, wherein the virtual link is usable to recover the data in the event of a system crash that occurs prior to the deleting the first metadata reference;

determining the updated version of the data is durable, wherein the determining the updated version of the data is durable comprises determining a write threshold is achieved for the updated version of the data;

in a finalize phase, deleting the first metadata reference; and reclaim disk space at the first storage location after deleting the first metadata reference and in response to determining that a zone containing the first storage location reaches a threshold for compaction, wherein:

the dispersed storage unit comprises data storage that comprises at least one drive;

the dispersed storage unit uses ZSS;

the first storage location and the second storage location are in respective ZSS zones of the at least one drive of the data storage; and a first pointer comprises the first metadata reference and a second pointer comprises the second metadata reference, each of the first metadata reference and the second metadata reference including: information about the data storage; an identifier of the respective ZSS zone; and a location within the respective ZSS zone.

10. The system of claim 9, wherein the program instructions cause the dispersed storage unit to maintain the first metadata reference and the second metadata reference concurrently for an amount of time during the persist phase.

* * * * *